(12) United States Patent
Gong et al.

(10) Patent No.: US 11,976,013 B2
(45) Date of Patent: May 7, 2024

(54) COMPOSITE COATING LAYER FOR CERAMIC MATRIX COMPOSITE SUBSTRATE

(71) Applicants: Rolls-Royce Corporation, Indianapolis, IN (US); Rolls-Royce plc, London (GB)

(72) Inventors: Stephanie Gong, Indianapolis, IN (US); Ngunjoh Lawrence Ndamka, Derby (GB); Matthew R. Gold, Carmel, IN (US); Li Li, Carmel, IN (US); Taylor K. Blair, Indianapolis, IN (US); Sunny Chang, Carmel, IN (US); Ann Bolcavage, Indianapolis, IN (US)

(73) Assignees: Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 1400 days.

(21) Appl. No.: 16/138,580

(22) Filed: Sep. 21, 2018

(65) Prior Publication Data
US 2019/0092701 A1    Mar. 28, 2019

Related U.S. Application Data

(60) Provisional application No. 62/563,947, filed on Sep. 27, 2017.

(51) Int. Cl.
*C04B 41/52*    (2006.01)
*B05B 7/20*    (2006.01)
(Continued)

(52) U.S. Cl.
CPC .............. *C04B 41/52* (2013.01); *B05B 7/205* (2013.01); *C04B 35/62807* (2013.01);
(Continued)

(58) Field of Classification Search
CPC .............. C04B 41/507; C04B 41/5068; C04B 41/5057; C04B 41/5042; C04B 41/5035;
(Continued)

(56) References Cited

U.S. PATENT DOCUMENTS 3,499,837 A    3/1970  Jaunarajs
5,911,882 A    6/1999  Benjamin et al.
(Continued)

FOREIGN PATENT DOCUMENTS

EP    2192098 A2    6/2010
EP    2767525 A1    8/2014
(Continued)

OTHER PUBLICATIONS

Chen et al., "A Self-Healing Environmental Barrier Coating: TiSi2-doped Y2Si2O7/ Barium Strontium Aluminosilicate Coating," Surface and Coatings Technology, vol. 307. Sep. 12, 2016, 5 pp.
(Continued)

*Primary Examiner* — Alex B Efta
(74) *Attorney, Agent, or Firm* — Shumaker & Sieffert, P.A.

(57) ABSTRACT

An article may include a substrate including a ceramic matrix composite (CMC); a composite coating layer including a first coating material that includes a rare-earth disilicate and a second coating material that includes at least one of a rare-earth monosilicate, a CMAS-resistant material, or a high-temperature dislocating material, where the second coating material forms a substantially continuous phase in the composite coating layer.

13 Claims, 4 Drawing Sheets

(51) Int. Cl.
  *C04B 35/628* (2006.01)
  *C04B 41/45* (2006.01)
  *C04B 41/50* (2006.01)
  *C04B 41/85* (2006.01)
  *C04B 41/89* (2006.01)
  *F01D 5/28* (2006.01)

(52) U.S. Cl.
  CPC .... *C04B 35/6281* (2013.01); *C04B 35/62813* (2013.01); *C04B 35/62815* (2013.01); *C04B 35/62828* (2013.01); *C04B 35/62831* (2013.01); *C04B 35/62884* (2013.01); *C04B 41/4545* (2013.01); *C04B 41/4582* (2013.01); *C04B 41/5024* (2013.01); *C04B 41/5031* (2013.01); *C04B 41/5035* (2013.01); *C04B 41/5042* (2013.01); *C04B 41/5057* (2013.01); *C04B 41/5068* (2013.01); *C04B 41/507* (2013.01); *C04B 41/85* (2013.01); *C04B 41/89* (2013.01); *F01D 5/288* (2013.01); *C04B 2235/3208* (2013.01); *C04B 2235/3224* (2013.01); *C04B 2235/3248* (2013.01); *C04B 2235/3813* (2013.01); *C04B 2235/3886* (2013.01)

(58) Field of Classification Search
  CPC ............ C04B 41/5013; C04B 41/5482; C04B 41/5454; C04B 41/52
  See application file for complete search history.

(56) References Cited

U.S. PATENT DOCUMENTS

| | | | |
|---|---|---|---|
| 6,444,335 B1 | 9/2002 | Wang et al. | |
| 6,528,190 B1 | 3/2003 | Campbell et al. | |
| 7,300,702 B2 | 11/2007 | Li et al. | |
| 8,206,792 B2 | 6/2012 | Gollob et al. | |
| 9,365,725 B2 | 6/2016 | Sarrafi-Nour et al. | |
| 9,890,089 B2 | 2/2018 | Kirby et al. | |
| 2006/0280955 A1 | 12/2006 | Spitsberg et al. | |
| 2007/0140835 A1* | 6/2007 | Albrecht | F01D 5/147 415/115 |
| 2009/0186237 A1* | 7/2009 | Lee | C23C 28/042 428/678 |
| 2010/0080984 A1 | 4/2010 | Lee | |
| 2010/0154422 A1 | 6/2010 | Kirby et al. | |
| 2011/0027517 A1* | 2/2011 | Kirby | C04B 41/009 427/336 |
| 2012/0018384 A1 | 1/2012 | Sawyer | |
| 2013/0122259 A1* | 5/2013 | Lee | C04B 41/5024 428/164 |
| 2013/0136915 A1 | 5/2013 | Naik | |
| 2013/0189531 A1 | 7/2013 | Lee | |
| 2014/0134452 A1 | 5/2014 | Sherman et al. | |
| 2014/0147242 A1* | 5/2014 | Ghasripoor | F01D 11/122 205/110 |
| 2014/0261080 A1 | 9/2014 | Lee | |
| 2015/0044444 A1 | 2/2015 | Gell et al. | |
| 2015/0159507 A1* | 6/2015 | Sivaramakrishnan | F01D 5/288 428/596 |
| 2015/0267058 A1 | 9/2015 | Lee | |
| 2015/0307980 A1 | 10/2015 | Espallargas et al. | |
| 2016/0017749 A1 | 1/2016 | Luthra et al. | |
| 2016/0068941 A1 | 3/2016 | Nair et al. | |
| 2016/0108510 A1* | 4/2016 | Kirby | C23C 4/02 501/133 |
| 2016/0214907 A1* | 7/2016 | Shim | C04B 35/573 |
| 2016/0273089 A1 | 9/2016 | Strock | |
| 2016/0362557 A1 | 12/2016 | Lee | |
| 2016/0376691 A1 | 12/2016 | Wadley et al. | |
| 2017/0122116 A1 | 5/2017 | Lee | |
| 2018/0305821 A1 | 10/2018 | Wan et al. | |
| 2019/0063250 A1 | 2/2019 | Shi et al. | |
| 2020/0102843 A1* | 4/2020 | Bianchi | C23C 4/18 |

FOREIGN PATENT DOCUMENTS

| | | |
|---|---|---|
| EP | 2778250 A2 | 9/2014 |
| EP | 2918698 A1 | 9/2015 |
| EP | 1999288 B1 | 9/2016 |
| EP | 3070073 A1 | 9/2016 |
| WO | 03004718 A2 | 1/2003 |
| WO | 2007108793 A1 | 9/2007 |
| WO | 2010/123612 A2 | 10/2010 |
| WO | 2013/188516 A1 | 12/2013 |
| WO | 2014/068082 A1 | 5/2014 |
| WO | 2018/033577 A1 | 2/2018 |

OTHER PUBLICATIONS

Zhu et al., "Development of Advanced Environmental Barrier Coatings for SiC/SiC Ceramic Matrix Composites: Path Toward 2700 Degrees F. Temperature Capability and Beyond," NASA, 41st Annual Conference on Composites, Materials, and Structures, Jan. 23-27, 2017, 24 pp.

Nguyen et al., "Iron Coated Sponge In Arsenic Removal," Fluid/Particle Separation Journal, vol. 16, No. 2, 2004 (Applicant points out, in accordance with MPEP 609.04(a), that the year of publication, 2004, is sufficiently earlier than the effective U.S. filing date, 2017, so that the particular month of publication is not in issue.) pp. 175-183.

Nguyen et al., "Iron-Coated Sponge as Effective Media to Remove Arsenic from Drinking Water," Water Quality Research Journal of Canada, vol. 41, No. 2, 2006 (Applicant points out, in accordance with MPEP 609.04(a), that the year of publication, 2006, is sufficiently earlier than the effective U.S. filing date, 2017, so that the particular month of publication is not in issue.) pp. 64-170.

Kumar et al., "Removal of Arsenic by Sorption to Iron-Coated Fibers," Water Research Foundation, 2009 (Applicant points out, in accordance with MPEP 609.04(a), that the year of publication, 2009, is sufficiently earlier than the effective U.S. filing date, 2017, so that the particular month of publication is not in issue.) 63 pp.

Fan et al., "Bond Stability and Oxidation Resistance of BSAS-Based Coating on C/SiC Composites", Surface & Coatings Technology, vol. 309 (2017) 35-46, Oct. 29, 2016, 12 pgs.

Mubarok et al., "Suspension Plasma Spraying of Sub-Micron Silicon Carbide Composite Coatings", Journal of Thermal Spray Technology, vol. 24., No. 5, Jun. 2015, 10 pgs.

Mubarok et al., "Synthesis of Thermal Spray Grade Silicon Carbide Feedstock Powder for Plasma Spray Deposition", ITSC 2015—Proceedings of the International Thermal Spray Conference, May 11-14, 2015, 6 pgs.

Wielage et al., "Development and Investigation of SiC-Based Thermal Spray Powders with Alumina-yttria Binder Matrix", International Thermal Spray Conference & Exposition, May 14-16, 2007, 1 pg., (Abstract only provided).

"Nickel—5% Aluminum Thermal Spray Powders," Oerlikon Metco, Material Product Data Sheet, accessed from https://www.oerlikon.com/ecomaXL/files/metco/oerlikon_DSMTS-0043.7_Ni5Al.pdf&download=12017, on Sep. 14, 2017, 5 pp.

U.S. Appl. No. 62/563,984, by Ngunjoh Lawrence Ndamka, filed Sep. 27, 2017.

U.S. Appl. No. 16/014,660, filed Jun. 21, 2018, by Li et al.

\* cited by examiner

COMPOSITE COATING LAYER FOR CERAMIC MATRIX COMPOSITE SUBSTRATE This application claims priority to U.S. Provisional Patent Application No. 62/563,947, filed Sep. 27, 2017, the entire contents of which are incorporated herein by reference.

TECHNICAL FIELD

The present disclosure generally relates to coatings and coating feedstocks for forming coatings on substrates including a ceramic matrix composite.

BACKGROUND

Substrates including a ceramic matrix composite (CMC) may be useful in a variety of contexts where mechanical and thermal properties are important, such as, for example, components in high-temperature mechanical systems, including gas turbine engines. Some substrates including a CMC may be coated with an overlying layer to reduce exposure of the substrate including a CMC to radiant heat or elements and compounds present in the operating environment of high-temperature mechanical systems.

SUMMARY

In some examples, the disclosure describes an article including a substrate including a ceramic matrix composite (CMC) and a composite coating layer. The composite coating layer includes a first coating material including a rare-earth disilicate and a second coating material including at least one of a rare-earth monosilicate, a CMAS-resistant material, or a high-temperature dislocating material. The second coating material forms a substantially continuous phase in the composite coating layer.

In some examples, the disclosure describes a method including introducing, to a heated plume of a thermal spray gun, a composite coating feedstock and directing, using the heated plume, the composite feedstock to a surface of a substrate including a ceramic matrix composite (CMC) to deposit a composite coating layer. The composite coating feedstock includes a plurality of particles, and at least some particles of the plurality of particles include a core and an outer layer at least partially encapsulating the core. The core includes a first coating material including a rare-earth disilicate and the outer layer includes a second coating material including at least one of a rare-earth monosilicate, a CMAS-resistant material, or a high-temperature dislocating material, where the second coating material at least partially encapsulates respective surfaces of the core. The composite coating layer includes the first coating material and the second coating material, where the second coating material forms a substantially continuous phase in the composite coating layer.

In some examples, the disclosure describes a composite coating feedstock that includes a core and an outer layer at least partially encapsulating the core. The core includes a first coating material including a rare-earth disilicate and the outer layer includes a second coating material including at least one of a rare-earth monosilicate, a CMAS-resistant material, or a high-temperature dislocating material, where the second coating material at least partially encapsulates respective surfaces of the core.

The details of one or more examples are set forth in the accompanying drawings and the description below. Other features, objects, and advantages will be apparent from the description and drawings, and from the claims.

DETAILED DESCRIPTION

Figure 1:
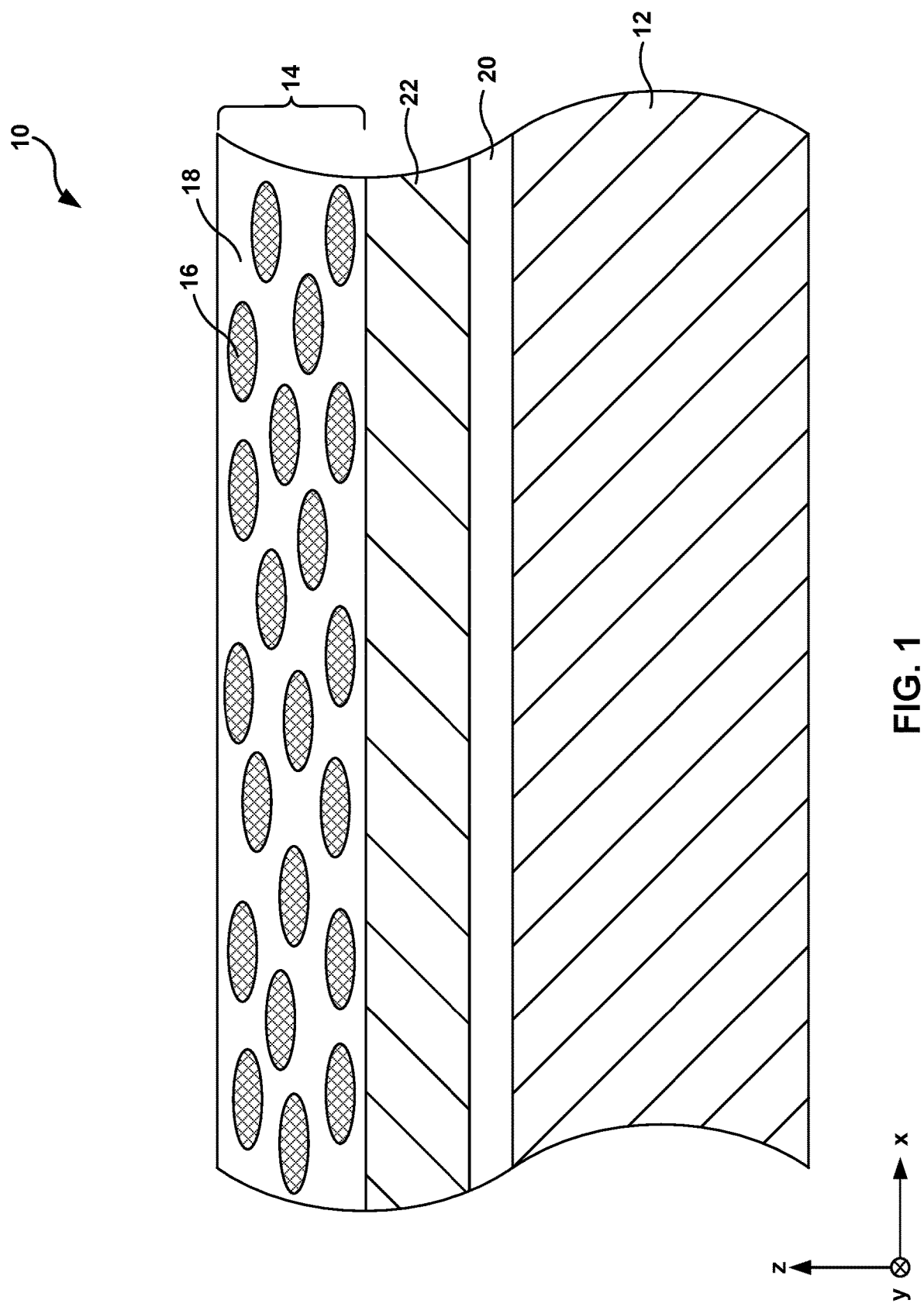
FIG. 1 is a conceptual diagram illustrating an example article that includes a substrate including a ceramic matrix composite (CMC) and a composite coating layer.

The disclosure describes articles and techniques including substrates that include a CMC and a composite coating layer on the CMC. The composite coating layer may include a first coating material including a rare-earth disilicate and a second coating material including at least one of a rare-earth monosilicate, a CMAS-resistant material, or a high-temperature dislocating material. The second coating material may form a substantially continuous phase in the composite coating layer. Example techniques may include depositing a composite coating feedstock onto a substrate including a CMC, where the composite coating feedstock includes a core including the first coating material and an outer layer including the second coating material at least partially encapsulating the core.

The composite coating layers described herein may provide multiple functions or properties to a high-temperature mechanical system component, such as reducing the CTE mismatch between coatings and/or the underlying substrate including a CMC, reducing the time and resources spent on creating the article including the composite coating layer, or the like. In some examples, the composite coating layer may include a rare-earth disilicate and at least one of a rare-earth monosilicate, a CMAS-resistant material, or a high-temperature dislocating material. By including a composite coating that includes two or more materials in a single layer, the resulting coating system may include fewer layers, which may reduce tendency of the coating system to spall due to a coefficient of thermal expansion (CTE) mismatch between two or more of the coating layers and/or the substrate. Additionally, or alternatively, a composite coating layer that includes two or more materials in a single layer may reduce time and resources spent to create articles compared to articles that include only layers with single materials.

The composite coating layer may be deposited on a substrate including a CMC by a thermal spraying process. In some examples, the composite coating layer may be deposited from a composite coating feedstock, which may include a core including a first coating material and an outer layer including a second coating material at least partially encapsulating the core. As such, the deposited composite coating layer may include splats of material in which the first coating material from the core is substantially surrounded by the second coating material from the outer layer. This results in a microstructure for the composite coating layer in which the second coating material forms a substantially continuous phase, which may reduce penetration of detrimental species compared to composite coating layers formed by co-spraying or spraying a powder blend of first and second coating materials. In this way, the disclosure describes articles and techniques including a composite coating layer that may increase the useful life of high-temperature mechanical system components compared to components without a composite coating layer or components formed using different techniques.

FIG. 1 is a conceptual diagram illustrating an example article 10 that includes a substrate 12 including a CMC and a composite coating layer 14 on substrate 12. In some examples, article 10 may include a composite coating layer 14, a bond coat 20, and an intermediate coating 22. In other examples, article 10 may include fewer than three coating layers. For example, article 10 may include composite coating layer 14 and bond coat 20. In some examples, article 10 may include more than three coatings. For example, intermediate coating 22 may include more than one layer and/or article 10 may include one or more additional coatings on composite coating layer 14. In general, article 10 may include any number of coating layers, as long as article 10 includes at least one composite coating layer 14.

Article 10 may be a component of a high-temperature mechanical system. For example, article 10 may be a blade track, a blade shroud, an airfoil, a blade, a vane, a combustion chamber liner, or the like, of a gas turbine engine.

Substrate 12 may include a ceramic, a ceramic matrix composite (CMC), or a silicon-based metal alloy. In some examples, substrate 12 may include a silicon metal-based material, such as silicon-based ceramic, a silicon-based CMC, or a silicon-based metal alloy.

In examples in which substrate 12 includes a ceramic, the ceramic may be substantially homogeneous. In some examples, substrate 12 including a ceramic may include a silicon-containing ceramic, such as, for example: silicon oxide ($SiO_2$), silicon carbide (SiC), or silicon nitride ($Si_3N_4$); aluminum oxide ($Al_2O_3$); aluminosilicate (e.g., $Al_2SiO_5$); or the like. In other examples, substrate 12 may include a metal alloy that includes silicon, such as a molybdenum-silicon alloy (e.g., $MoSi_2$) or a niobium-silicon alloy (e.g., $NbSi_2$).

In examples in which substrate 12 includes a CMC, substrate 12 may include a matrix material and a reinforcement material. The matrix material may include a ceramic material, such as, for example, SiC, $Si_3N_4$, $Al_2O_3$, aluminosilicate, $SiO_2$, or the like. The CMC may further include a continuous or discontinuous reinforcement material. For example, the reinforcement material may include discontinuous whiskers, platelets, or particulates. As other examples, the reinforcement material may include a continuous monofilament or multifilament weave. In some examples, the reinforcement material may include SiC, $Si_3N_4$, $Al_2O_3$, aluminosilicate, $SiO_2$, or the like. In some examples, substrate 12 may include a SiC—SiC CMC, in which a fibrous preform including SiC fibers is impregnated with SiC particles from a slurry, then melt infiltrated with silicon metal or a silicon alloy to form the melt-infiltrated SiC—SiC CMC.

In some examples, article 10 may include bond coat 20 on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, i.e., there are no intermediate layers or coatings. In other examples, article 10 may omit bond coat 20, and intermediate coating 22 and/or composite coating layer 14 may be directly on substrate 12.

Bond coat 20 may include a composition that provides adherence between substrate 12 and a layer on bond coat 20, such as intermediate coating 22. In some examples, the adherence provided by bond coat 20 between substrate 12 and intermediate coating 22 may be greater than the adherence between substrate 12 and intermediate coating 22 without bond coat 20. In some examples, bond coat 20 may be on substrate 12, composite coating layer 14 may be on bond coat 20, and article 10 may omit intermediate coating 22.

Bond coat 20 may include silicon metal (e.g., elemental silicon; Si), a silicon-containing alloy, a silicon-containing ceramic, or a silicon-containing compound. In some examples, the presence of Si in bond coat 20 may promote adherence between bond coat 20 and substrate 12 and between bond coat 20 and intermediate coating 22, such as, for example, when substrate 12, intermediate coating 22, or both, includes silicon metal or a silicon-containing alloy or compound.

Bond coat 20 may optionally include at least one additive. The optional at least one additive may include, for example, at least one of SiC, an oxidation enhancer, a transition metal carbide, a transition metal boride, or a transition metal nitride. SiC may affect the properties of bond coat 20. For example, SiC particles may modify oxidation resistance of bond coat 20, modify chemical resistance of bond coat 20, influence the CTE of bond coat 20, or the like. In some examples, bond coat 20 may include between about 1 volume percent (vol. %) and about 40 vol. % SiC, such as between about 1 vol. % and about 20 vol. % SiC, or between about 5 vol. % and about 40 vol. % SiC, or between about 5 vol. % and about 20 vol. % SiC.

In some examples in which bond coat 20 includes an oxidation enhancer, the oxidation enhancer may include at least one of molybdenum, hafnium, or ytterbium. In some examples in which bond coat 20 includes an oxidation enhancer, bond coat 20 may include great than 0 wt. % and less than about 10 wt. % of the oxidation enhancer. The oxidation enhancer may facilitate formation of a stable oxide scale on a surface of bond coat 20, which may increase adhesion between bond coat 20 and intermediate coating 22, reduce diffusion of elements through bond coat 20, or both.

Bond coat 20 additionally or alternatively may include at least one of a transition metal carbide, a transition metal boride, or a transition metal nitride. The transition metal may include, for example, Cr, Mo, Nb, W, Ti, Ta, Hf, or Zr. The at least one transition metal carbide may include at least one of $Cr_3C_2$, $Cr_7C_3$, $Cr_{23}C_6$, $Mo_2C$, NbC, WC, TaC, HfC, or ZrC. The at least one transition metal boride may include at least one of TaB, $TaB_2$, $TiB_2$, $ZrB_2$, HfB, or $HfB_2$. The at least one transition metal nitride may include at least one of TiN, ZrN, HfN, $Mo_2N$, or TaN.

In some examples, bond coat 20 may include between about 40 vol. % and about 99 vol. % silicon metal and a balance of the at least one of a transition metal carbide, a transition metal nitride, or a transition metal boride. In some examples, bond coat 20 may include between about 1 vol. % and about 30 vol. %, or between about 5 vol. % and about 20 vol. % of the at least one of a transition metal carbide, a transition metal boride, or a transition metal nitride, and a balance silicon metal and any additional constituents. The particular composition ranges may vary based on the CTE of the at least one of a transition metal carbide, a transition metal boride, or a transition metal nitride.

Transition metal carbides, transition metal borides, and transition metal nitrides may have a different CTE than silicon metal. By mixing silicon metal and a transition metal carbide, a transition metal boride, or transition metal nitride, the CTE of bond coat 20 may be increased to more closely match the CTE of substrate 12, the CTE of intermediate coating 22, the CTE of composite coating layer 14, or any combination thereof. This may reduce stress at the interfaces between bond coat 20 and adjacent layers during thermal cycling of article 10. Additionally, or alternatively, the addition of the at least one of the transition metal carbide, the transition metal boride, or the transition metal nitride may improve oxidation resistance of bond coat 20 compared to a bond layer including only silicon.

Bond coat 20 may define any suitable thickness (measured in the z-axis direction of FIG. 1, where FIG. 1 illustrates orthogonal x-, y-, and z-axes for purposes of illustration only). In some examples, bond coat 20 defines a thickness of between about 5 micrometers and about 250 micrometers, such as between about 50 micrometers and about 100 micrometers.

Bond coat 20 may be formed on substrate 12 using, for example, thermal spraying, e.g., air plasma spraying, high velocity oxy-fuel (HVOF) spraying, low vapor plasma spraying, suspension thermal spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

In some examples, article 10 may include intermediate coating 22 on bond coat 20. In other examples, article 10 may omit intermediate coating 22, or intermediate coating 22 may not be on bond coat 20. Intermediate coating 22 may include, for example, an EBC, a TBC, a CMAS-resistant coating, an abradable coating, or the like. In some examples, a single intermediate coating 22 may perform two or more of these functions. For example, an EBC may provide environmental protection, thermal protection, and CMAS-resistance to substrate 12. In some examples, instead of including a single intermediate coating 22, article 10 may include a plurality of intermediate coatings, such as at least one EBC, at least one TBC, at least one CMAS-resistant coating, at least one abradable coating, or combinations thereof.

An EBC may include at least one of a rare-earth oxide, a rare-earth silicate, an aluminosilicate, or an alkaline earth aluminosilicate. For example, an EBC may include mullite, barium strontium aluminosilicate (BSAS), barium aluminosilicate (BAS), strontium aluminosilicate (SAS), at least one rare-earth oxide, at least one rare-earth monosilicate ($RE_2SiO_5$, where RE is a rare-earth element), at least one rare-earth disilicate ($RE_2Si_2O_7$, where RE is a rare-earth element), or combinations thereof. The rare-earth element in the at least one rare-earth oxide, the at least one rare-earth monosilicate, or the at least one rare-earth disilicate may include at least one of Lu, Yb, Tm, Er, Ho, Dy, Tb, Gd, Eu, Sm, Pm, Nd, Pr, Ce, La, Y, or Sc.

In some examples, an EBC may include at least one rare-earth oxide and alumina, at least one rare-earth oxide and silica, or at least one rare-earth oxide, silica, and alumina. In some examples, an EBC may include an additive in addition to the primary constituents of the EBC. For example, the additive may include at least one of $TiO_2$, $Ta_2O_5$, $HfSiO_4$, an alkali metal oxide, or an alkali earth metal oxide. The additive may be added to the EBC to modify one or more desired properties of the EBC. For example, the additive components may increase or decrease the reaction rate of the EBC with CMAS, may modify the viscosity of the reaction product from the reaction of CMAS and the EBC, may increase adhesion of the EBC to bond coat 20 and/or composite coating layer 14, may increase or decrease the chemical stability of the EBC, or the like.

In some examples, the EBC may be substantially free (e.g., free or nearly free) of hafnia and/or zirconia. Zirconia and hafnia may be susceptible to chemical attack by CMAS, so an EBC substantially free of hafnia and/or zirconia may be more resistant to CMAS attack than an EBC that includes zirconia and/or hafnia. An EBC may be a substantially dense layer, e.g., may include a porosity of less than about 10 vol. %, measured as a fraction of open space compared to the total volume of the EBC using, for example, a microscopy technique, liquid porosimetry, a method based on Archimedes' principle, e.g., a fluid saturation technique, or the like.

Additionally, or alternatively, intermediate coating 22 may include a TBC. The TBC may have a low thermal conductivity (e.g., both an intrinsic thermal conductivity of the material(s) that forms the TBC and an effective thermal conductivity of the TBC as constructed) to provide thermal insulation to substrate 12, bond coat 20, and/or intermediate coating 22. In some examples, a TBC may include a zirconia- or hafnia-based material, which may be stabilized or partially stabilized with one or more oxides. In some examples, the inclusion of rare-earth oxides such as ytterbia, samaria, lutetia, scandia, ceria, gadolinia, neodymia, europia, yttria-stabilized zirconia (YSZ), zirconia stabilized by a single or multiple rare-earth oxides, hafnia stabilized by a single or multiple rare-earth oxides, zirconia-rare-earth oxide compounds, such as $RE_2Zr_2O_7$ (where RE is a rare-earth element), hafnia-rare-earth oxide compounds, such as $RE_2Hf_2O_7$ (where RE is a rare-earth element), and the like may help decrease the thermal conductivity (by conduction) of the TBC. In some examples, a TBC may include a base oxide including zirconia or hafnia, a first rare earth oxide including ytterbia, a second rare earth oxide including samaria, and a third rare earth oxide including at least one of lutetia, scandia, ceria, neodymia, europia, or gadolinia. A TBC may include porosity, such as a columnar or microporous microstructure, which may contribute to relatively low thermal conductivity of the TBC.

In some examples, intermediate coating 22 may include a CMAS-resistant coating. The CMAS-resistant coating may include an element or compound that reacts with CMAS to form a solid or a highly-viscous reaction product (i.e., a reaction product that is a solid or highly viscous at the temperatures experienced by article 10), or reduces a reaction rate of the CMAS-resistant coating with CMAS or a migration rate of CMAS into the CMAS-resistant coating. In some examples, the CMAS-resistant coating includes $Al_2O_3$ and at least one rare-earth oxide, such as, for example, an oxide of at least one of Sc, Y, La, Ce, Pr, Nd, Pm, Sm, Eu, Gd, Tb, Dy, Ho, Er, Tm, Yb, Lu, or combinations thereof.

The combination of $Al_2O_3$ and at least one rare-earth oxide may allow tailoring of one or more properties of the CMAS-resistant coating, such as, for example, the chemical reactivity of the CMAS-resistant coating with CMAS, the viscosity of the reaction products, the CTE of the CMAS-resistant coating, the chemical compatibility of the CMAS-resistant coating with bond coat 20 and/or composite coating layer 14, or the like.

In some examples, the CMAS-resistant coating is essentially free of $ZrO_2$ and/or $HfO_2$. That is, in these examples, the CMAS-resistant coating includes at most trace amounts of $ZrO_2$ and/or $HfO_2$, such as, for example, the amounts present in commercially-available rare-earth oxides.

In some examples, the CMAS-resistant coating may include $SiO_2$ in addition to the $Al_2O_3$ and at least one rare-earth oxide to form one or more discrete phase regions of the $SiO_2$, $Al_2O_3$, and rare-earth oxide. $SiO_2$ can be added to the CMAS-resistant coating to allow further manipulation of the properties of the CMAS-resistant coating, such as, for example, the chemical reactivity, viscosity of the reaction products, the CTE, the chemical compatibility of the CMAS-resistant coating with bond coat 20 and/or composite coating layer 14, or the like.

In some examples, the CMAS-resistant coating optionally includes other additive components, such as, for example, $TiO_2$, $Ta_2O_5$, $HfSiO_4$, alkali metal oxides, alkali earth metal oxides, or mixtures thereof. The additive components may be added to the CMAS-resistant coating to modify one or more desired properties of the CMAS-resistant coating. For example, the additive components may increase or decrease the reaction rate of the CMAS-resistant coating with CMAS, may modify the viscosity of the reaction product from the reaction of CMAS and the CMAS-resistant coating, may increase adhesion of the CMAS-resistant coating to bond coat 20 and/or composite coating layer 14, may increase or decrease the chemical stability of the CMAS-resistant coating, or the like.

In some examples, the CMAS-resistant coating may include up to about 99 molar percent (mol. %) of the at least one rare-earth oxide, ±1 mol. %, and up to about 90 mol. % of $Al_2O_3$, with a total of 100 mol. %. In some examples, the CMAS-resistant coating may also include up to about 90 mol. % of $SiO_2$. In other examples, the CMAS-resistant coating may additionally include up to about 50 mol. % of at least one of $TiO_2$, $Ta_2O_5$, $HfSiO_4$, an alkali oxide, or an alkali earth oxide.

In some examples, intermediate coating 22 may include an abradable coating. In some such examples, intermediate coating 22 may be configured to be abraded, e.g., by a blade of a gas turbine engine, in order to form a relatively tight seal between article 10 and another component, such as, for example, a blade of a gas turbine engine. Abradability may include a disposition to break into relatively small pieces when exposed to a sufficient physical force. Abradability may be influenced by the material characteristics of the material(s) in the abradable coating, such as fracture toughness and fracture mechanism (e.g., brittle fracture), as well as the porosity of the abradable coating. In examples in which intermediate coating 22 includes an abradable coating, intermediate coating 22 may exhibit thermal shock resistance and high-temperature capability.

The abradable coating may include any suitable material. For example, the abradable coating may include at least one of a rare-earth oxide, a rare-earth silicate, an aluminosilicate, or an alkaline earth aluminosilicate. In some examples, as described above, intermediate coating 22 including an abradable coating includes at least one rare-earth disilicate, mullite, BSAS, BAS, SAS, at least one rare earth oxide, at least one rare earth monosilicate, or combinations thereof. Additionally, or alternatively, intermediate coating 22 including an abradable coating may include any of the compositions described herein with respect to the EBC.

Regardless of the composition of intermediate coating 22, intermediate coating 22 may have a dense microstructure, a porous microstructure, a columnar microstructure, or a combination of at least two of dense, porous, or columnar microstructures. In some examples, a dense microstructure may be more effective in preventing the infiltration of CMAS and other deleterious environmental species, while a porous or columnar microstructure may be more strain tolerant during thermal cycling, more easily abraded, and/or have lower thermal conductivity. In some examples, intermediate coating 22 with a dense microstructure may have a porosity of less than about 10 vol. %, such as less than about 8 vol. %, less than about 5 vol. %, or less than about 2 vol. %, where porosity is measured as a percentage of pore volume divided by total volume of intermediate coating 22. In some examples, intermediate coating 22 with a porous microstructure may have a porosity of more than about 10 vol. %, such as more than about 15 vol. %, more than about 20 vol. %, or more than about 30 vol. %, where porosity is measured as a fraction of open space compared to the total volume of intermediate coating 22. Porosity may be measured using a microscopy technique, liquid porosimetry, a method based on Archimedes' principle, e.g., a fluid saturation technique, or the like.

Intermediate coating 22 may be formed on bond coat 20 using, for example, thermal spraying, e.g., air plasma spraying, high velocity oxy-fuel (HVOF) spraying, low vapor plasma spraying, suspension thermal spraying; PVD, including EB-PVD, DVD, and cathodic arc deposition; CVD; slurry process deposition; sol-gel process deposition; electrophoretic deposition; or the like.

As shown in FIG. 1, article 10 includes composite coating layer 14. Composite coating layer 14 may provide additional functions to substrate 12, protect substrate 12, and/or reduce the time and resources spent creating article 10. Composite coating layer 14 may prevent erosion and/or contamination of substrate 12, bond coat 20, and/or intermediate coating 22. Additionally, or alternatively, composite coating layer 14 may allow a better seal to be formed between article 10 and another component in comparison to some articles that do not include composite coating layer 14. In some examples, composite coating layer 14 may be on intermediate coating 22. In other examples, composite coating layer 14 may be on substrate 12 or on bond coat 20.

Composite coating layer 14 may include a first coating material 16 and a second coating material 18 that may each provide different functions to composite coating layer 14. In other examples, first coating material 16 and second coating material 18 may each provide the same or similar functions to composite coating layer 14.

First coating material 16 may include a rare-earth disilicate (e.g., $RE_2Si_2O_7$ wherein RE is a rare-earth element). The rare earth disilicate may have good thermal expansion coefficient compatibility with the underlying substrate 12. In some examples, first coating material 16 including a rare-earth disilicate may prevent deleterious components such as CMAS, sand, water vapor, or the like from the high-temperature environment from penetrating through composite coating layer 14 to substrate 12, bond coat 20, and/or intermediate coating 22.

In some examples, first coating material 16 may include other components, such as those described above with respect to the EBC coating example of intermediate coating 22. For example, in addition to at least one rare earth disilicate, first coating material 16 may include at least one of a free rare-earth oxide, a rare-earth monosilicate ($RE_2SiO_5$, where RE is a rare-earth element), free alumina, free silica, an aluminosilicate, an alkaline earth aluminosilicate, titanium oxide (e.g., $TiO_2$), tantalum oxide (e.g., $Ta_2O_5$), an alkali metal oxide, or an alkali metal oxide. As used herein, a free element or compound is unreacted with other components in the layer or coating. For example, a coating layer that includes a rare-earth monosilicate may also include free rare earth oxide, free silica, or both, depending on the processing used to form the coating layer including the rare-earth monosilicate, the ratios of the constituents of the coating layer, or both.

Example aluminosilicates include mullite, barium strontium aluminosilicate (BSAS), barium aluminosilicate (BAS), strontium aluminosilicate (SAS), or combinations thereof. The additional components may be added to the rare earth disilicate to modify one or more desired properties of first coating material 16. For example, the additive components may increase or decrease the reaction rate of first coating material 16 with CMAS, may modify the viscosity of the reaction product from the reaction of CMAS and first coating material 16, may increase adhesion of first coating material 16 to second coating material 18 and/or layers adjacent to composite coating layer 14, may increase or decrease the chemical stability of firsts coating material 16, or the like.

In some examples, first coating material 16 may be substantially free (e.g., free or nearly free) of hafnia and/or zirconia. Zirconia and hafnia may be susceptible to chemical attack by CMAS, so a first coating material 16 substantially free of hafnia and/or zirconia may be more resistant to CMAS attack than a first coating material 16 that includes zirconia and/or hafnia Composite coating layer 14 also includes second coating material 18. Second coating material 18 may include at least one of a rare-earth monosilicate (e.g., $RE_2SiO_5$ wherein RE is a rare-earth element), a CMAS-resistant material, or a high-temperature dislocating material. In examples in which second coating material 18 includes a rare-earth monosilicate, second coating material 18 including a rare-earth monosilicate may increase the resistance of composite coating layer 14 to recession and/or degradation due to water vapor in comparison to some composite coating layers 14 that do not include a rare-earth monosilicate. For example, in some coating layers including a rare-earth disilicate but not including a rare-earth monosilicate, the coating layer may be less resistant to water vapor recession due to the rare-earth disilicate being more reactive with water vapor to form silicon hydroxide than a rare-earth monosilicate.

In some examples, second coating material 18 includes a CMAS-resistant material. In some such examples, the CMAS-resistant material may be the same or substantially the same as the materials described with reference to the CMAS-resistant coating described above. For example, the CMAS-resistant material may include at least one of a rare-earth zirconate, a free rare-earth oxide, calcia, free alumina, or free silica. In some examples, the CMAS-resistant material includes free $Al_2O_3$ and at least one free rare-earth oxide. The combination of $Al_2O_3$ and at least one rare-earth oxide may allow tailoring of one or more properties of the CMAS-resistant material, such as, for example, the chemical reactivity of the CMAS-resistant material with CMAS, the viscosity of the reaction products, the CTE of the CMAS-resistant material, the chemical compatibility of the CMAS-resistant material with bond coat 20 and/or first coating material 16, or the like.

In some examples, the CMAS-resistant material is essentially free of $ZrO_2$ and/or $HfO_2$. That is, in these examples, the CMAS-resistant material includes at most trace amounts of $ZrO_2$ and/or $HfO_2$, such as, for example, the amounts present in commercially-available rare-earth oxides.

In some examples, the CMAS-resistant material may include $SiO_2$ in addition to the $Al_2O_3$ and at least one rare-earth oxide to form one or more discrete phase regions of the $SiO_2$, $Al_2O_3$, and rare-earth oxide. $SiO_2$ can be added to the CMAS-resistant material to allow further manipulation of the properties of the CMAS-resistant material, such as, for example, the chemical reactivity, viscosity of the reaction products, the CTE, the chemical compatibility of the CMAS-resistant coating with bond coat 20 and/or first coating material 16, or the like.

In some examples, the CMAS-resistant material optionally includes other additive components, such as, for example, $TiO_2$, $Ta_2O_5$, $HfSiO_4$, alkali metal oxides, alkali earth metal oxides, or mixtures thereof. The additive components may be added to the CMAS-resistant material to modify one or more desired properties of the CMAS-resistant material, as described above.

In some examples, second coating material 18 may include a high-temperature dislocating material. The high-temperature dislocating material may include at least one of hafnium diboride, zirconium diboride, tantalum nitride, or tantalum carbide. A high-temperature dislocating material may make composite coating layer 14 more lubricious in comparison to some coating layers that do not include a high-temperature dislocating material. In this way, composite coating layer 14 may fracture in a more controlled manner, e.g., without damaging the integrity of composite coating layer 14, and/or composite coating layer 14 may have improved strength, heat dissipation, and/or heat retention properties in comparison to some coating layers that do not include second coating material 18 including a high-temperature dislocating material.

Regardless of whether second coating material 18 includes a rare earth monosilicate, a CMAS-resistant material, a high-temperature dislocating material, or combinations thereof, in some examples, composite coating layer 14 may include about 5 vol. % to about 50 vol. % of second coating material 18. In some examples, composite coating layer 14 may include a substantially continuous phase of second coating material 18, with domains of first coating material 16 disposed throughout the substantially continuous phase of second coating material 18. In this way, the function(s) of second coating material 18 may be provided throughout composite coating layer 14. For example, a substantially continuous phase of second coating material 18 including a CMAS-resistant material may provide improved resistance to erosion and/or contamination from deleterious environmental species in comparison to some coating layers in which second coating material 18 is present in discontinuous phase domains.

In some examples, first coating material 16 may be substantially evenly distributed throughout the substantially continuous phase of second coating material 18. First coating material 16 being substantially evenly distributed throughout the substantially continuous phase of second coating material 18 may provide composite coating layer 14 with the function(s) provided by first coating material 16 throughout the composite coating layer 14. In some examples in which first coating material 16 is not substantially evenly distributed throughout the substantially continuous phase of second coating material 18, the coating layer may have reduced thermal cycling strain resistance, e.g., due to volume differences and/or varying degrees of CTE mismatch throughout the coating layer, increased susceptibility to spallation, and/or decreased functionality, e.g., the coating layer not abrading as designed.

In some examples, composite coating layer 14 may include splats of first coating material 16 substantially fully encapsulated by second coating material 18. As used herein, a "splat" describes a flattened or substantially disc-shaped particle of first coating material 16 at least partially encapsulated by second coating material 18, and/or an area of composite coating layer 14 including first material 16 in a substantially elliptical shape or a substantially disc-shape and at least partially encapsulated by second coating material 18. As can be seen in FIG. 1, in this way, first coating material 16 of each splat may be longer in the x-direction than in the z-direction of FIG. 1 (where orthogonal x-, y-, and z-axes are shown for purposes of illustration only). In some examples, although not shown in FIG. 1, second coating material 18 may define a layer of material over each domain of first coating material 16. In some examples, although not shown in FIG. 1, some porosity may be present between adjacent splats, e.g., between adjacent portions of second coating material 18 from adjacent splats.

In some examples, composite coating layer 14 may have a dense or a substantially dense microstructure. In some examples, a dense microstructure may be more effective in reducing or substantially preventing the infiltration of CMAS and other deleterious environmental species into and/or through composite coating layer 14. In some examples, composite coating layer 14 with a dense microstructure may have a porosity of less than about 10 vol. %, such as less than about 8 vol. %, less than about 5 vol. %, or less than about 2 vol. %, where porosity is measured as a percentage of pore volume in composite coating layer 14 divided by total volume of composite coating layer 14. Porosity may be measured as a fraction of open space compared to the total volume of composite coating layer 14 using, for example, a microscopy technique, liquid porosimetry, a method based on Archimedes' principle, e.g., a fluid saturation technique, or the like.

In other examples, composite coating layer 14 may have a porous microstructure. The porosity may be present within first coating material 16, second coating material 18, or between adjacent splats. In some such examples, composite coating layer 14 may be a porous abradable coating. Porosity of composite coating layer 14 may reduce the thermal conductivity of composite coating layer 14, may affect the abradability of composite coating layer 14, or both. In some examples, a composite coating layer 14 that includes a porous microstructure includes a porosity between about 10 vol. % and about 50 vol. %. In some examples, composite coating layer 14 with a porous microstructure may have a porosity of more than about 10 vol. %, such as more than about 15 vol. %, more than about 20 vol. %, or more than about 30 vol. %, where porosity is measured as a percentage of pore volume divided by total volume of composite coating layer 14, and is measured using for example, microscopy, liquid porosimetry, a method based on Archimedes' principle, e.g., a fluid saturation technique, or the like.

In some examples in which composite coating layer 14 includes second coating material 18 including a high-temperature dislocating material, composite coating layer 14 may have a lower porosity than some abradable coatings that do not include a high-temperature dislocating material. For example, a composite coating layer 14 includes second coating material 18 including a high-temperature dislocating material and which is an abradable coating may include a porosity between about 10 vol. % and about 35 vol. %, or between about 10 vol. % and about 25 vol. %. In this way, due to the lubricious nature of the high-temperature dislocating material, a composite coating layer 14 that includes second coating material 18 including a high-temperature dislocating material may be abradable while also having a reduced porosity. In some examples, the reduced porosity may better prevent deleterious environmental species from eroding and/or contaminating substrate 12, bond coat 20, intermediate coating 22, and/or composite coating layer 14 in comparison to abradable coatings with a higher porosity.

Composite coating layer 14 may be formed on intermediate coating 22, bond coat 20, and/or substrate 12 using any suitable thermal spraying technique, such as, for example, air or inert gas shrouded plasma spraying, high velocity oxy-fuel (HVOF) spraying, detonation spraying, suspension thermal spraying, low vapor plasma spraying, or the like.

The thickness of composite coating layer 14 measured in the z-axis direction of FIG. 1 may be selected based at least in part on the chemical properties or mechanical properties of composite coating layer 14. In some examples, the thickness of composite coating layer 14 may be between about 75 micrometers and about 2500 micrometers, between about 175 micrometers and about 250 micrometers, or between about 750 micrometers and about 1450 micrometers. In some examples, the thickness of composite coating layer 14 may be based on the composition and/or function of composite coating layer 14. For example, a composite coating layer 14 including first coating material 16 including a rare-earth disilicate and second coating material 18 including a rare-earth monosilicate may define a thickness between about 175 micrometers and about 250 micrometers, and a composite coating layer 14 that is a porous, abradable coating may define a thickness between about 750 micrometers and about 1450 micrometers.

Composite coating layer 14 may include first coating material 16 and second coating material 18, as described above. Composite coating layer 14 may be deposited from a composite coating feedstock, in which particles may include both first coating material 16 and second coating material 18. For example, first coating material 16 may form a core of the particles in the composite coating feedstock, and second coating material 18 may form an outer layer at least partially encapsulating first coating material 16 in the particles in the composite coating feedstock. In some examples, depositing composite coating layer 14 using a composite coating feedstock may allow for composite coating layer 14 to be substantially uniform in distribution of first coating material 16 and second coating material 18 throughout composite coating layer 14. For example, second coating material 18 may form a substantially continuous phase in composite coating layer 14, first coating material 16 may be substantially evenly distributed throughout the substantially continuous phase of second coating material 18, or both.

In some examples in which composite coating layer 14 includes second coating material 18 including a high-temperature dislocating material, composite coating layer 14 may have a higher volume percentage of first coating material 16 than some composite coating layers 14 that do not include a high-temperature dislocating material. For example, composite coating layer 14 may include additional first coating material 16 that is not deposited as a splat at least partially encapsulated by second coating material 18. Due to the high melting temperature of the high-temperature dislocating material, additional first coating material 16 may be co-deposited with a composite coating feedstock so that a larger percentage of the materials forming composite coating layer 14 melt or soften during deposition of composite coating layer 14. In turn, composite coating layer 14 may be stronger than some composite coating layers 14 including a high-temperature dislocating material that are deposited as a composite coating feedstock alone.

Figure 2:
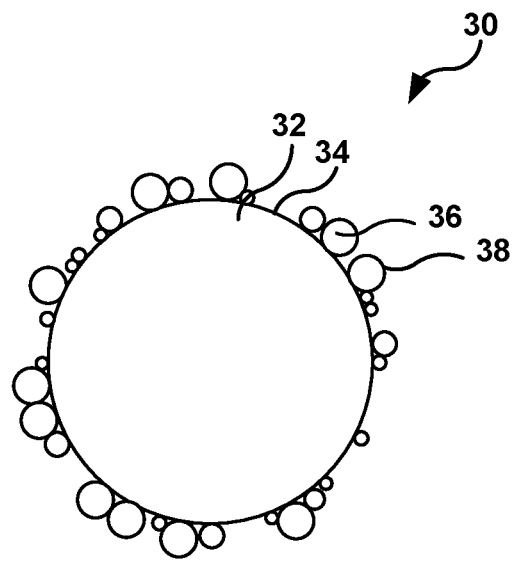
FIG. 2 is a conceptual diagram illustrating an example composite coating feedstock for forming a composite coating layer, which composite coating feedstock includes a core a least partially encapsulated by an outer layer.
Figure 3:
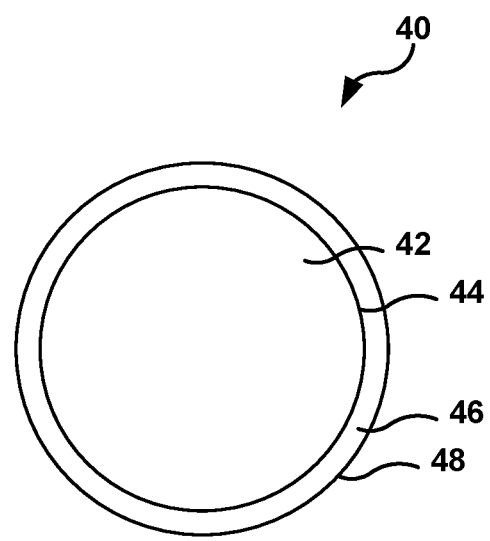
FIG. 3 is a conceptual diagram illustrating another example composite coating feedstock for forming a composite coating layer, which composite coating feedstock includes a core a least partially encapsulated by an outer layer.

FIGS. 2 and 3 are conceptual diagrams illustrating example composite coating feedstocks. In particular, FIG. 2 is a conceptual diagram illustrating an example composite coating feedstock 30 for forming a composite coating layer that includes a core a least partially encapsulated by an outer layer. As shown in FIG. 2, first coating material 32 may define a core including a surface 34 on which second coating material 36 is disposed. Second coating material 36 may adhere to surface 34 to at least partially or substantially fully encapsulate first coating material 32.

In some examples, composite coating feedstock 30 may be formed by physically blending first coating material 32 and second coating material 36, e.g., using milling. For example, first coating material 32 may be formed using a milling technique, which may result in first coating material 32 including a plurality of particles that possess a first average particle size. As used herein, "average particle size" describes an average or a median particle diameter. Similarly, in some examples, second coating material 36 may be formed using a milling technique, which may result in second coating material 36 including a plurality of particles that include a second average particle size. In some examples, first coating material 32 and second coating material 36 may be milled separately. In other examples, first coating material 32 and second coating material 36 may be milled together. Milling may include any suitable milling technique, such as, for example, ball milling, high pressure grinding rolls, or the like. In some examples, after milling, the particles of first coating material 32, the particles of second coating material 36, or both, may be sorted or filtered to result in a selected size distribution. For example, the particles may be sorted or filtered using sieving, screening, or the like. Milling and sorting or filtering may allow selection of an average particle size for one or both of first and second coating materials 32 and 36.

In some examples, as shown in FIG. 2, the average particle size of first coating material 32 that forms a core may be larger than the average particle size of the particles of second coating material 36 that form the outer layer that at least partially encapsulates the core. In other examples, the average particle size of the particles of first coating material 32 may be the same or substantially the same as the average particle size of the particles of second coating material 36. For example, the average particle size of the particles of first coating material 32 that form the core may be between about between about 0.05 micrometers and about 125 micrometers, or between about 15 micrometers and about 100 micrometers. The average particle size of the second coating material 36 that form the outer layer may be between about 0.01 micrometers and about 100 micrometers, between about 0.01 micrometers and about 25 micrometers, between about 0.01 micrometers and about 10 micrometers, or between about 0.05 micrometers and about 5 micrometers.

In some examples, sufficient electrostatic or other cohesive forces may be generated during co-milling of first coating material 32 and second coating material 36 such that at least some particles of second coating material 36 adhere to surface 34 of at least some particles of first coating material 32 to produce a composite coating feedstock 30. In other examples, first coating material 32 and second coating material 36 may be physically blended and wet milled, or otherwise processed to form a suspension of first coating material 32 and second coating material 36 in at least one fluid, then the suspension may be spray dried such that at least some particles of second coating material 36 adhere to surface 34 of at least some particles of first coating material 32 to produce a composite coating feedstock 30. In some examples, after spray drying, the composite coating feedstock 30 may be heated to further adhere at least some particles of second coating material 36 to surface 34 of at least some particles of first coating material 32. One or more additives may be added to a suspension of first coating material 32 and second coating material 36, in some examples, to facilitate adhesion of second coating material 36 to first coating material 32. For example, an additive such as a binder or a surfactant may be added to the suspension of first coating material 32 and second coating material 36 to increase adhesion between second coating material 36 and first coating material 32. In this way, physically blending first coating material 32 and second coating material 36 may produce composite coating feedstock 30 that may be used in a thermal spraying process to deposit composite coating layer 14 (FIG. 1).

In some examples, composite coating feedstock 30 may be formed using a cladding process. For example, as described above, first coating material 32 and second coating material 36 may be milled to have a selected size distribution of each of first coating material 32 and second coating material 36. The selected size distributions of each of first coating material 32 and second coating material 36 may be different from each other, e.g., second coating material 36 may have a smaller average particle size distribution than that of first coating material 32. First coating material 32 and second coating material 36 may then be mixed together, and in some examples, may also be mixed with a binder to help facilitate agglomeration of second coating material 36 around first coating material 32 so that second coating material 36 at least partially encapsulates first coating material 32. After second coating material 36 is agglomerated around first coating material 32, the mixture may be sintered to form composite coating feedstock 30. In turn, composite coating feedstock 30 may be used in a thermal spraying process to deposit composite coating layer 14. (FIG. 1).

In some examples, composite coating feedstock 30 may be co-deposited with one or more additional materials. For example, composite coating feedstock 30 including second coating material 36 including a high-temperature dislocating material may be co-depositing using a thermal spraying process with additional first coating material 32 (e.g., not in the form of composite coating feedstock 30) to allow for increased melting or softening of the particles during deposition to form the composite coating 14.

FIG. 3 is a conceptual diagram illustrating another example composite coating feedstock 40 for forming a composite coating layer that includes a core a least partially encapsulated by an outer layer. As shown in FIG. 3, a first coating material 42 forms a core that defines a surface 44 on which second coating material 46 forms an outer layer to at least partially encapsulate first coating material 42. For example, second coating material 46 may be formed on surface 44 by a sol-gel process, chemical vapor deposition, physical vapor deposition, refractory precursor coating, or the like. In some examples, second coating material 46 may at least partially encapsulate first coating material 42. In other examples, second coating material 46 may substantially fully encapsulate first coating material 42. A surface 48 of second coating material 46 may define the exterior of composite coating feedstock 40.

In some examples, first coating material 42 that forms the core may have an average or median diameter between about between about 0.05 microns and about 125 microns, or between about 15 micrometers and about 100 micrometers. In some examples, the thickness of second coating material 46, measured radially from surface 44 to surface 48 may be between about 0.01 micrometers and about 20 micrometers, or between about 0.05 micrometers and about 5 micrometers.

Figure 4:
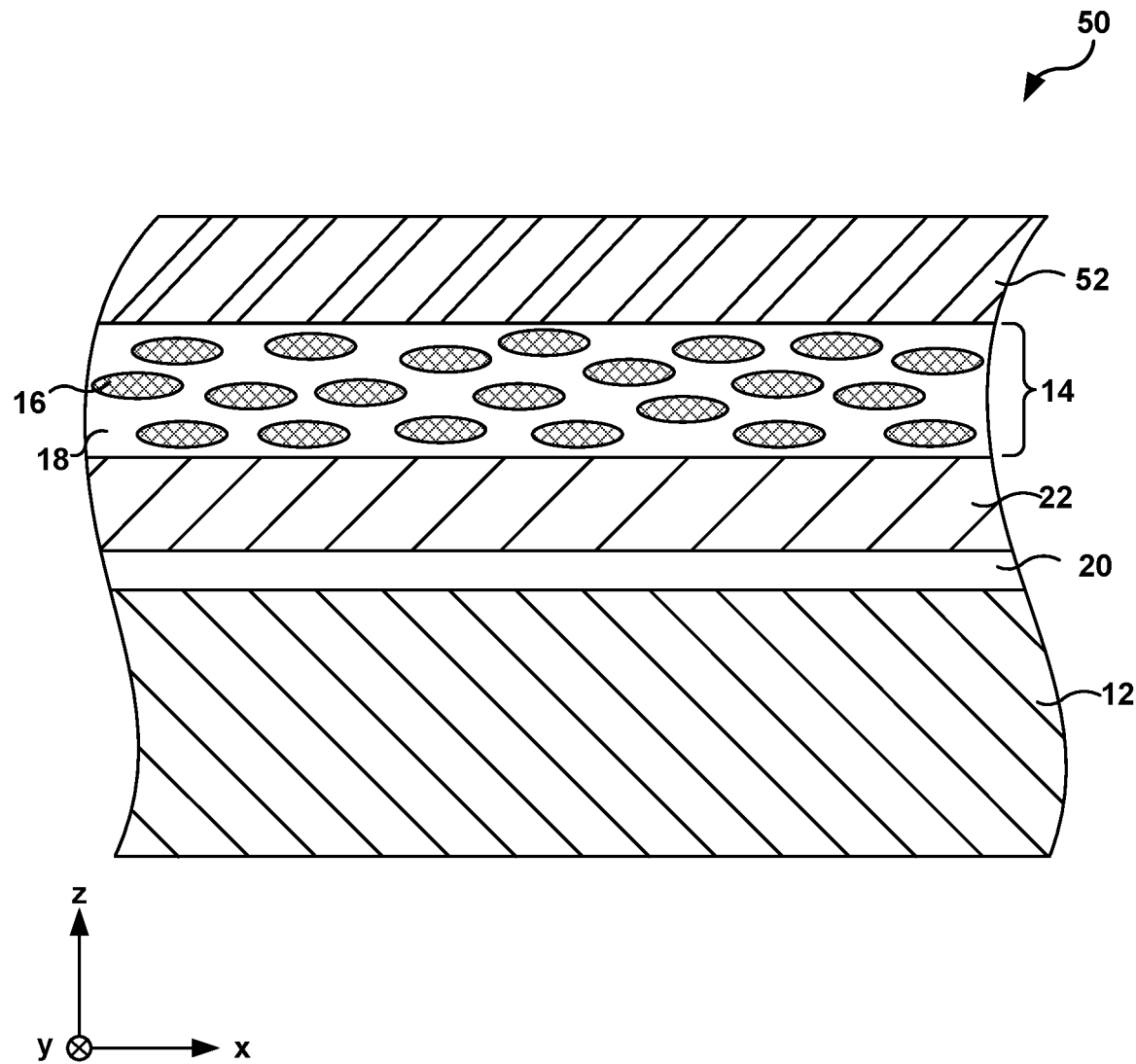
FIG. 4 is a conceptual diagram illustrating an example article that includes a substrate including a CMC, a composite coating layer, and an overlayer.

FIG. 4 is a conceptual diagram illustrating an example article 50 that includes a substrate 12 including a CMC, a composite coating layer 14, and an overlayer 52. Article 50 may include substrate 12, composite coating layer 14, bond coat 20, intermediate coating 22, and overlayer 52. In some examples, substrate 12, composite coating layer 14, bond coat 20, and intermediate coating 22 may be the same or substantially the same as described with respect to FIG. 1.

In some examples, overlayer 52 may include at least one of an EBC, a TBC, an abradable coating, a CMAS-resistant coating, or the like. In some examples, the EBC, the TBC, the abradable coating, or the CMAS-resistant coating may be the same or substantially the same as described with respect to FIG. 1. Overlayer 22 may provide additional protection or functions to article 50. For example, overlayer 52 may include an abradable coating to create a tight seal between article 50 and another component of a high-temperature mechanical system. In other examples, overlayer 52 may include a CMAS-resistant coating and/or an EBC to protect substrate 12, composite coating layer 14, bond coat 20, and/or intermediate coating 22 from erosion and/or contamination.

In some examples, composite coating layer 14 may be a transition layer between intermediate coating 22 and overlayer 52. For example, composite coating layer 14 may have a CTE between the CTEs of intermediate coating 22 and overlayer 52. In this way, composite coating layer 14 as a transition layer between intermediate coating 22 and overlayer 52 may lessen the amount of CTE mismatch between the coatings of article 50. In other examples, composite coating layer 14 may be a transition layer for substrate 12 and/or coatings other than intermediate coating 22, e.g., bond coat, and overlayer 52.

Figure 5:
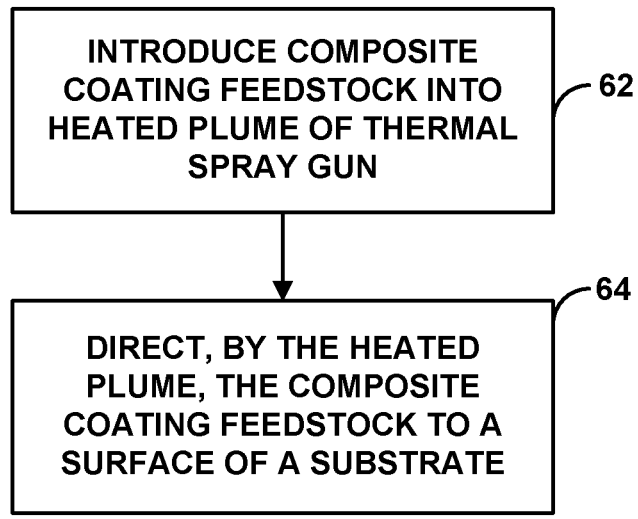
FIG. 5 is a flow diagram illustrating an example technique for forming a composite coating layer on a substrate including a CMC.

FIG. 5 is a flow diagram illustrating an example technique for forming a composite coating layer on a substrate including a CMC. The technique of FIG. 5 will be described with respect to article 50 of FIG. 4 for ease of description only. A person having ordinary skill in the art will recognize and appreciate that the technique of FIG. 5 may be used to form articles other than article 50 of FIG. 4.

The technique of FIG. 5 may include introducing a composite coating feedstock that includes a first coating material and a second coating material to a heated plume of a thermal spray gun (62). The composite coating feedstock may include, for example, composite coating feedstock 30 of FIG. 2 or composite coating feedstock 40 of FIG. 3. For example, the composite coating feedstock may include a core including first coating material 16 that includes a rare-earth disilicate and an outer layer at least partially encapsulating the core. The outer layer may include second coating material 18. Second coating material 18 may include at least one of a rare-earth monosilicate, a CMAS-resistant material, or a high-temperature dislocating material.

The composite coating feedstock may be introduced into the heated plume of the thermal spray gun using any suitable technique. For example, the composite coating feedstock may be introduced into the heated plume of the thermal spray gun by a gravimetric powder feeder, a rotating disk powder feeder, or the like. The heated plume of the thermal spray gun may be formed by any suitable thermal spraying process. For example, the thermal spraying process may include air or inert gas shrouded plasma spraying, high velocity oxy-fuel (HVOF) spraying, detonation spraying, suspension thermal spraying, low vapor plasma spraying, or the like. In some examples, the composite coating feedstock may be introduced into the heated plume by introducing the composite coating feedstock internally to the thermal spray gun, e.g., within a space between the cathode and the anode of a plasma spray gun or into a combustion chamber of a HVOF or detonation spray gun. In other examples, the composite coating feedstock may be introduced into the heated plume externally of the thermal spray gun. In some examples, an additional material, such as, for example, additional first coating material 16 not in the composite coating feedstock, may be introduced to the heated plume of the thermal spray gun with, or at the same time as, the composite coating feedstock.

The technique of FIG. 5 also may include, after introducing the composite coating feedstock to the heated plume of the thermal spray gun (62), directing, by the heated plume, first coating material 16 and second coating material 18 to a surface of substrate 12 to deposit composite coating layer 14 that includes first coating material 16 and second coating material 18 (64). Because first coating material 16 and second coating material 18 are directed to the surface of substrate 12 using a heated plume, first coating material 16 and second coating material 18 may soften prior to contacting the surface of substrate 12 and form a splat upon contacting the surface of substrate 12. FIGS. 1 and 3 illustrate example shapes of first coating material 16 in the splats. In some examples, second coating material 18 may form a substantially continuous phase in composite coating layer 14.

In some examples, such as examples in which second coating material 18 includes a high-temperature dislocating material, second coating material 18 may not soften or significantly soften prior to contacting the surface of substrate 12. In some such examples, additional first coating material 16 may be co-deposited with the composite coating feedstock to form composite coating layer 14, such that a larger percentage of the material deposited to form composite coating layer 14 softens prior to contacting the surface of substrate 12. For example, first coating material 16 of the composite coating feedstock and the additional coating material 16 co-deposited may soften prior to contacting the surface of substrate 12. The additional first coating material 16 that softens prior to contacting the surface of substrate 12 may help facilitate composite coating layer 14 being deposited as splats, forming second coating material 18 as a substantially continuous phase in composite coating layer 14, substantially evenly distributing first coating material 16 throughout the substantially continuous phase of second coating material 18, or the like, even if second coating material 18 does not soften or significantly soften prior to contacting the surface of substrate 12.

In some examples, the thermal spray gun may be configured to move the heated plume relative to a stationary surface of substrate 12 to direct first coating material 16 and second coating material 18 to the surface of substrate 12 to deposit composite coating layer 14. In other examples, a thermal spraying system may be configured to move a surface of substrate 12 relative to a stationary heated plume of the thermal spray gun. For example, substrate 12 may be detachably fixed to a moveable platform of the thermal spraying system. In other examples, a thermal spraying system may be configured to move both the thermal spray gun and substrate 12.

First coating material 16 and second coating material 18 may be substantially similar to the first and second coating materials described above with respect to FIGS. 1-4. For example, first coating material 16 may include a rare-earth disilicate and second coating material 18 may include at least one of a rare-earth monosilicate, a CMAS-resistant material, or a high-temperature dislocating material. In some examples, first coating material 16 may form a core, and second coating material 18 may form an outer layer that at least partially encapsulates the core.

In some examples, the technique of FIG. 5 may optionally include, before directing first coating material 16 and second coating material 18 to the surface of substrate 12 (64), depositing bond coat 20 on substrate 12. In some such examples, composite coating layer 14 may be deposited on bond coat 20. In some examples, bond coat 20 may be deposited on substrate 12 using thermal spraying, e.g., air plasma spraying, high velocity oxy-fuel (HVOF) spraying, low vapor plasma spraying, suspension thermal spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

In some examples, the technique of FIG. 5 may optionally include, after depositing bond coat 20, and prior to before directing first coating material 16 and second coating material 18 to the surface of substrate 12 (64), depositing intermediate coating 22 on bond coat 20. In some such examples, composite coating layer 14 may be deposited on intermediate coating 22. In some examples, intermediate coating 22 may be formed directly on substrate 12. As described above, intermediate coating 22 may include at least one of an EBC, a TBC, an abradable coating, a CMAS-resistant coating, or the like. In some examples, intermediate coating 22 may be formed on bond coat 20 using thermal spraying, e.g., air plasma spraying, high velocity oxy-fuel (HVOF) spraying, low vapor plasma spraying, suspension thermal spraying; PVD, including EB-PVD, DVD, and cathodic arc deposition; CVD; slurry process deposition; sol-gel process deposition; electrophoretic deposition; or the like.

In some examples, the technique of FIG. 5 may optionally include, after directing first coating material 16 and second coating material 18 to the surface of substrate 12 (64), depositing overlayer 52 on composite coating layer 14. As described above, overlayer 52 may include at least one of an EBC, a TBC, an abradable coating, a CMAS-resistant coating, or the like. In some examples, overlayer 52 may be formed on bond coat 20 using thermal spraying, e.g., air plasma spraying, high velocity oxy-fuel (HVOF) spraying, low vapor plasma spraying, suspension thermal spraying; PVD, including EB-PVD, DVD, and cathodic arc deposition; CVD; slurry process deposition; sol-gel process deposition; electrophoretic deposition; or the like.

In some examples, the technique of FIG. 5 may optionally include forming the composite coating feedstock. Forming the composite coating feedstock may include at least one of physical blending, a sol-gel process, chemical vapor deposition, a cladding process, or refractory precursor coating.

For example, as discussed above with respect to FIGS. 2-3, composite coating feedstock may include first coating material 16 that may form a core and second coating material 18 that may form an outer layer that at least partially encapsulates the core. For example, second coating material 18 may at least partially adhere to, or be formed on, a surface of the core including first coating material 16.

Figure 6:
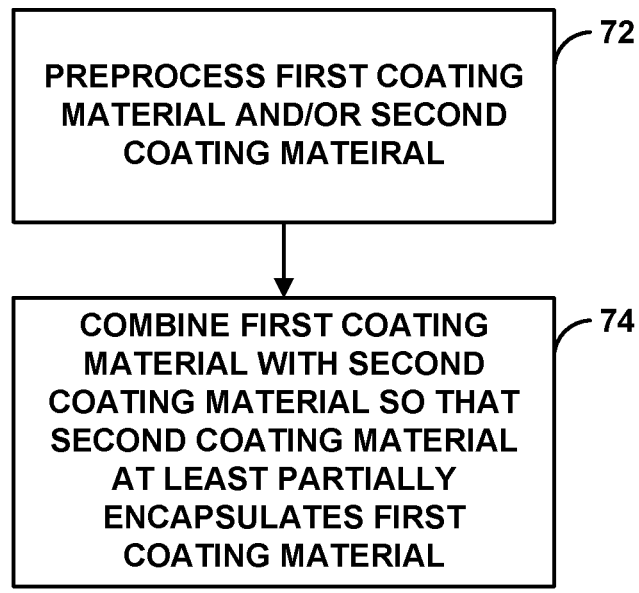
FIG. 6 is a flow diagram illustrating an example technique for forming a composite coating feedstock that includes a core at least partially encapsulated by an outer layer.

FIG. 6 is a flow diagram illustrating an example technique forming a composite coating feedstock 30 that includes a core at least partially encapsulated by an outer layer. The technique of FIG. 6 will be described with respect to composite coating feedstock 30 of FIG. 2 for ease of description only. A person having ordinary skill in the art will recognize and appreciate that the technique of FIG. 6 may be used to form composite coating feedstocks other than composite coating feedstock 30 of FIG. 2.

In some examples, the technique of FIG. 6 may optionally include preprocessing first coating material 32 and/or second coating material 36 (72). For example, first coating material 32 and/or second coating material 36 may be milled to result in an average particle size of first coating material 32 and/or second coating material 36. Additionally, or alternatively, second coating material 36 may be sorted or filtered, e.g., using sieving, screening, or the like, to result in a selected size distribution. In other examples, other preprocessing techniques may be used, or first coating material 32 and/or second coating material 36 may not be preprocessed.

The technique of FIG. 6 may include combining first coating material 32 with second coating material 36 so that second coating material 36 at least partially encapsulates first coating material 32 (74). In some examples, first coating material 32 and second coating material 36 each may by introduced into any type of vessel suitable for blending of dry material, such as, for example, a rotary drum, a ribbon blender, an auger, or the like. In other examples, first coating material 32 and second coating material 36 each may by introduced into any type of suitable storage vessels, such as, for example, a drum, a hopper, a silo, or the like. In the example technique of FIG. 6, first and second coating materials 32 and 36 may be the same or substantially similar to the first and second coating materials 32 and 36 as described above with respect to FIGS. 1-4.

In some examples, combining first coating material 32 with second coating material 36 so that second coating material 36 at least partially encapsulates first coating material 32 (74) may include blending first coating material 32 and second coating material 36. Blending may include dry blending by any suitable means, such as, for example, a rotary drum, a ribbon blender, an auger mixer, a whirlwind mixer, a milling apparatus, or the like. In some examples, blending may include sufficient mixing to produce a substantially consistent distribution of first coating material 32 and second coating material 36. Additionally, blending may include applying sufficient force between particles of first coating material 32 and particles of second coating material 36 to cause or facilitate particles of second coating material 36 attaching to surfaces of first coating material 32. For example, first coating material 32 may form a core, and second coating material 36 may be brought in contact with the core such that at least a portion of second coating material 36 at least partially attaches to surface 34 of the core of first coating material 32.

In other examples, combining first coating material 32 with second coating material 36 so that second coating material 36 at least partially encapsulates first coating material 32 (74) may include refractory precursor coating. For example, combining first coating material 32 with second coating material 36 so that second coating material 36 at least partially encapsulates first coating material 32 (74) may include mixing first coating material 32 and a precursor of second coating material 36. The precursor may include at least one element or compound that may at least partially encapsulate a core including first coating material 32, and which may be further processed to form second coating material 36. The precursor may include any suitable precursor material that is converted to second coating material 36. For example, the precursor may include at least of one of a precursor of a rare-earth monosilicate, a precursor of a CMAS-resistant material, or a precursor of a high-temperature dislocating material. The precursor may be applied to the core including first coating material 32 in any manner. For example, the precursor may include a suspension or solution in which a material that forms second coating material 36 is suspended or dissolved in a solvent. The suspension or solution may optionally include, for example, a dispersant, a viscosity adjusting agent, a surface tension adjusting agent, or the like. In some examples, after mixing the first coating material 32 and the precursor, first coating material and the precursor may be heat-treated. In some examples, heat-treating first coating material 32 and the precursor may include heat-treating first coating material 32 and the precursor at between about 450° C. to about 1400° C. Heat-treating may include heating first coating material 32 and the precursor by any suitable means. For example, heating may include heating by conduction, convection, or radiation using a furnace, a laser, a plasma, an arc welding apparatus, or the like.

In another example, combining first coating material 32 with second coating material 36 so that second coating material 36 at least partially encapsulates first coating material 32 (74) may include a cladding process. For example, selected size distributions of each of first coating material 32 and second coating material 36 from preprocessing first coating material 32 and/or second coating material 36 (72) may be mixed with each other. In some examples, a binder may also be mixed with first coating material 32 and second coating material 36 to help facilitate agglomeration of second coating material 36 around first coating material 32 so that second coating material 36 at least partially encapsulates first coating material 32. After second coating material 36 is agglomerated around first coating material 32, the mixture may be sintered to form composite coating feedstock 30 including first coating material 32 at least partially encapsulated by second coating material 36.

In other examples, combining first coating material 32 with second coating material 36 so that second coating material 36 at least partially encapsulates first coating material 32 (74) may include, chemical vapor deposition, physical vapor deposition, a sol-gel process, or the like.

Various examples have been described. These and other examples are within the scope of the following claims.

What is claimed is:

1. An article comprising:
    a substrate including a ceramic matrix composite (CMC);
    a single composite coating layer formed from a composite feedstock, the composite feedstock comprising:
        a first coating material comprising a rare-earth disilicate; and
        a second coating material comprising at least one of a calcium-magnesium-alumino-silicate (CMAS)-resistant material or a high-temperature dislocating material,
    wherein the second coating material forms a substantially continuous phase in the single composite coating layer, and wherein the single composite coating layer comprises splats of the first coating material evenly distributed throughout the substantially continuous phase of the second coating material and substantially fully encapsulated by the second coating material.

2. The article of claim 1, wherein the second coating material comprises the CMAS-resistant material, and wherein the CMAS-resistant material comprises at least one of a rare-earth zirconate, a rare-earth oxide, calcia, alumina, or silica.

3. The article of claim 1, wherein the second coating material comprises the high-temperature dislocating material, and wherein the high-temperature dislocating material comprises at least one of hafnium diboride, zirconium diboride, tantalum nitride, or tantalum carbide.

4. The article of claim 1, wherein the single composite coating layer is substantially dense having a porosity of less than about 10 vol. %.

5. The article of claim 1, wherein the single composite coating layer is a porous abradable coating having a porosity of greater than about 10 vol. %.

6. The article of claim 1, further comprising an environmental barrier coating, wherein the environmental barrier coating is between the substrate and the single composite coating layer.

7. The article of claim 1, further comprising an overlayer on the single composite coating layer, wherein the single composite coating layer is a compositional transition layer between one of the substrate, a bond coat, or an environmental barrier coating and the overlayer.

8. The article of claim 1, wherein the single composite coating layer comprises about 5 vol. % to about 50 vol. % of the second coating material.

9. A composite feedstock comprising:
    a core comprising a first coating material comprising a rare-earth disilicate; and
    an outer layer at least partially encapsulating the core, wherein the outer layer comprises a second coating material comprising at least one of a rare-earth monosilicate, a CMAS-resistant material, or a high-temperature dislocating material, wherein the second coating material at least partially encapsulates respective surfaces of the core.

10. The composite feedstock of claim 9, wherein the second coating material comprises the CMAS-resistant material, and wherein the CMAS-resistant material comprises at least one of a rare-earth zirconate, a rare-earth oxide, calcia, alumina, or silica.

11. The composite feedstock of claim 9, wherein the second coating material comprises the high-temperature dislocating material, and wherein the high-temperature dislocating material comprises at least one of hafnium diboride, zirconium diboride, tantalum nitride, or tantalum carbide.

12. The composite feedstock of claim 9, wherein the composite feedstock is formed by at least one of a physical blending, a sol-gel process, chemical vapor deposition, a cladding process, or refractory precursor coating.

13. An article comprising:
    a substrate including a ceramic matrix composite (CMC);
    a single composite coating layer comprising:
        a first coating material comprising a rare-earth disilicate; and
        a second coating material comprising at least one of a calcium-magnesium-alumino-silicate (CMAS)-resistant material or a high-temperature dislocating material, wherein the second coating material forms a substantially continuous phase in the single composite coating layer, and wherein the single composite coating layer comprises splats of the first coating material evenly distributed throughout the substantially continuous phase of the second coating material and substantially fully encapsulated by the second coating material.

\* \* \* \* \*